(12) United States Patent
Agliata et al.

(10) Patent No.: US 10,347,879 B2
(45) Date of Patent: Jul. 9, 2019

(54) RECLOSER BATTERY ASSEMBLY WITH TORQUE-LIMITING CAP

(71) Applicant: Hubbell Incorporated, Shelton, CT (US)

(72) Inventors: Peter M. Agliata, Birmingham, AL (US); Nathaniel Ginzton, Boise, ID (US)

(73) Assignee: Hubbell Incorporated, Shelton, CT (US)

( * ) Notice: Subject to any disclaimer, the term of this patent is extended or adjusted under 35 U.S.C. 154(b) by 239 days.

(21) Appl. No.: 15/584,928

(22) Filed: May 2, 2017

(65) Prior Publication Data

US 2017/0317319 A1 Nov. 2, 2017

Related U.S. Application Data

(60) Provisional application No. 62/330,355, filed on May 2, 2016.

(51) Int. Cl.
  *H01M 2/04* (2006.01)
  *H01M 2/02* (2006.01)
  (Continued)

(52) U.S. Cl.
  CPC .......... *H01M 2/043* (2013.01); *H01H 31/006* (2013.01); *H01H 75/04* (2013.01); *H01M 2/34* (2013.01); *H02H 7/26* (2013.01); *H02J 7/0026* (2013.01); *H02J 7/241* (2013.01); *F16B 31/027* (2013.01); *H01M 2/022* (2013.01); *H01M 2/1016* (2013.01); *H01M 2200/00* (2013.01);
  (Continued)

(58) Field of Classification Search
  CPC ............ H01M 2/043; H01M 2200/00; H01M 2200/20; H01M 2/34; H01M 2/1016; H01M 2/022; H02H 7/26; H01H 31/006; H01H 75/04; H02J 7/241; H02J 7/0026; H01R 11/14; H01R 4/22; F16B 31/027
  See application file for complete search history.

(56) References Cited

U.S. PATENT DOCUMENTS 2,542,132 A * 2/1951 Goertzen ............... H01H 35/02
                                                200/61.51
4,581,504 A * 4/1986 Hamel, Sr. ........... H01H 35/146
                                                200/61.08
(Continued)

OTHER PUBLICATIONS

U.S. Appl. No. 15/584,917, filed May 2, 2017 entitled "Recloser Battery Assembly".
(Continued)

*Primary Examiner* — Muhammad S Siddiquee
(74) *Attorney, Agent, or Firm* — Michael Best & Friedrich, LLP

(57) ABSTRACT

A circuit interrupting device for use with an electrical power distribution system includes a housing containing a circuit interrupting mechanism. A battery tube is positioned in the housing. A battery assembly is configured to be inserted into the battery tube. The battery assembly includes an assembly body having a first end and a second end and a battery is positioned within the assembly body. A cap is connected to the assembly body and configured to connect the battery assembly to the battery tube. The cap includes a torque-limiting device that prevents overtightening of the cap to the battery tube.

20 Claims, 9 Drawing Sheets

(51) Int. Cl.
*H02J 7/00* (2006.01)
*H01R 4/22* (2006.01)
*H01M 2/34* (2006.01)
*H02J 7/24* (2006.01)
*H01H 75/04* (2006.01)
*H01H 31/00* (2006.01)
*H02H 7/26* (2006.01)
*H01R 11/14* (2006.01)
*F16B 31/02* (2006.01)
*H01M 2/10* (2006.01)

(52) U.S. Cl.
CPC ........... *H01M 2200/20* (2013.01); *H01R 4/22* (2013.01); *H01R 11/14* (2013.01)

(56) References Cited

U.S. PATENT DOCUMENTS

| | | | |
|---|---|---|---|
| 4,956,755 A * | 9/1990 | Maglica | F21L 4/005 362/206 |
| 5,110,003 A | 5/1992 | MacWilliams | |
| 5,378,549 A * | 1/1995 | Eylon | H01M 2/1055 429/1 |
| 6,794,596 B2 | 9/2004 | Rhein et al. | |
| 2002/0179571 A1* | 12/2002 | Rhein | H01H 33/6662 218/7 |
| 2004/0008510 A1* | 1/2004 | Mah | F21L 13/06 362/192 |
| 2004/0144757 A1 | 7/2004 | Rhein et al. | |
| 2010/0177507 A1* | 7/2010 | West | H01M 2/1055 362/183 |

OTHER PUBLICATIONS

U.S. Appl. No. 15/584,932, filed May 2, 2017 entitled "Recloser Battery Assembly With Hot Stick Adaptor and Battery Tube Adaptor".

VERSA-TECH Single-Phase Redoser for Distribution Systems, Hubbell. Maintenance Manual. Mar. 30, 2015 <URL: http://www.hubbellpowersystems.com/resources/instructions/chance-construction/pdf/PSP862-0311.pdf> (41 pages).

PCT/US2017/030637 International Search Report and Written Opinion dated Sep. 18, 2017 (14 pages).

* cited by examiner

RECLOSER BATTERY ASSEMBLY WITH TORQUE-LIMITING CAP

RELATED APPLICATION(S)

This application is based on U.S. provisional application Ser. No. 62/330,355, filed May 2, 2016, the disclosure of which is incorporated herein by reference in its entirety and to which priority is claimed.

FIELD

Various exemplary embodiments relate to a battery assembly for a utility line circuit interrupter such as a recloser.

BACKGROUND

Conventional circuit interrupting devices, such as circuit breakers, and reclosers, provide protection for power distribution systems and the various apparatus on those power distribution systems by isolating a faulted section from the upstream power source in the system. Fault current, or momentary current surges, in the system can occur under various conditions, including lightning, an animal or tree contacting the power lines, or adjacent power lines contacting each other. For example, windy conditions often cause power lines strung between poles to swing, thereby momentarily touching each other or a grounded conductor. These types of transitory events cause momentary power line short circuits that in turn cause fuses to burn out or circuit breaker to trip.

Most of the faults occurring on a line are transient faults, as opposed to permanent faults, and do not require permanent protection. Therefore, reclosers are a common solution for clearing these types of transient faults without causing a permanent power outage. Reclosers are typically mounted to support structures in electrical power distribution systems to provide continuous electrical service up to a programmed current threshold. Reclosers detect faults, i.e., overcurrent events past the programmed threshold, and interrupt the load current when the overcurrent event persists for a predetermined amount of time which is determined by the overcurrent value. If the recloser operates and temporarily interrupts the load current, it will automatically restore service after the transient fault condition is gone. If a fault is permanent, the recloser locks out, i.e., permanently opens the circuit, after a preset number of operations, thereby isolating the faulted section of the system.

SUMMARY

According to an exemplary embodiment, a circuit interrupting device for use with an electrical power distribution system includes a housing containing a circuit interrupting mechanism. A battery tube is coupled to the housing. A battery assembly is configured to be inserted into the battery tube. The battery assembly includes an assembly body having a first end and a second end. A battery is positioned in the assembly body. A cap is connected to the assembly body and configured to connect the battery assembly to the battery tube. The cap assembly includes a torque-limiting device that prevents overtightening of the cap to the battery tube.

According to another exemplary embodiment, a circuit interrupting device for use within an electrical power distribution system includes a housing containing a circuit interrupting mechanism. A battery tube having a first connector is positioned in the housing. A battery assembly is configured to be inserted into the battery tube. The battery assembly including a second connector to mate with the first connector to form a secure connection. The battery assembly includes a torque limiting device that is configured to prevent overtightening of the first connector and second connector.

According to another exemplary embodiment, a circuit interrupting device for use within a power distribution system includes a housing containing a circuit interrupting mechanism. A battery tube is positioned in the housing. A battery assembly is configured to be inserted into the battery tube. The battery assembly includes an assembly body having a first end and a second end. A battery is positioned in the assembly body. A cap is connected to the first end of the assembly body. A ratchet member is releasably connected to the cap. A first connector is adjacent to the ratchet member. A biasing member is positioned between the first connector and the ratchet member.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Figure 1:
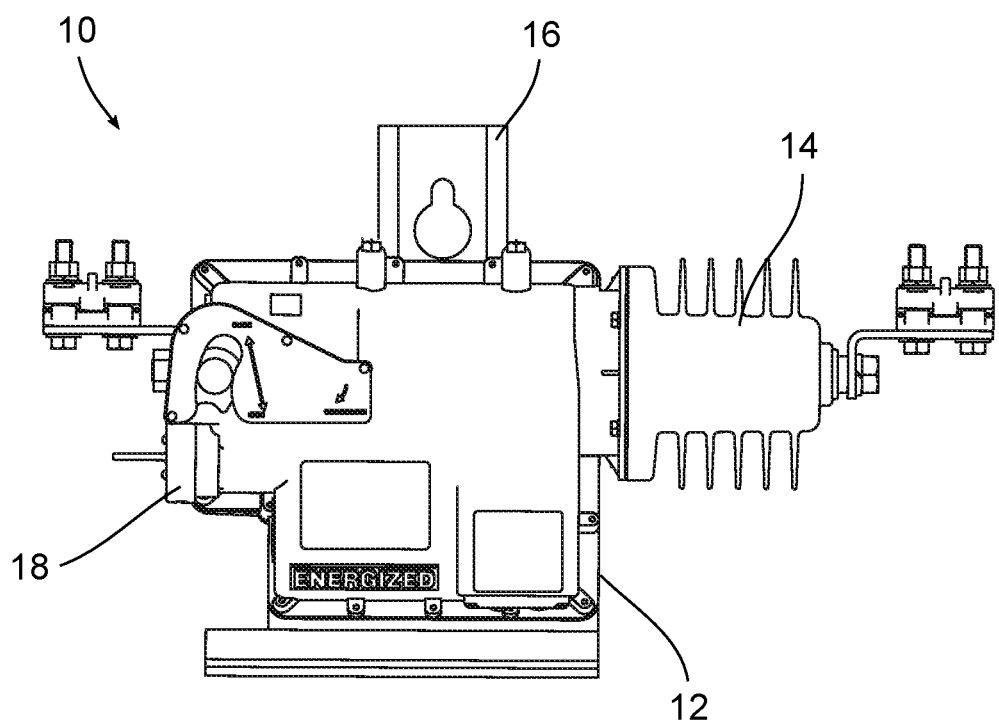
FIG. 1 is a front view of an exemplary automatic recloser.

FIG. 1 shows, a circuit interrupting device for a power distribution system, such as an automatic recloser 10, although certain aspects of the circuit interrupting device can be incorporated into other circuit interrupting devices, such as circuit breakers that do not reclose. The recloser 10 generally includes a housing 12 containing a circuit interrupting mechanism 14 used in conjunction with an actuator, which is electrically controlled by an electronic control assembly. The circuit interrupting mechanism 14 is preferably a vacuum interrupter, but can be any type of interrupting means such as SF6 gas interrupter or a solid dielectric interrupter. The actuator is preferably a solenoid, but may be any known electrical or mechanical actuating or operating mechanism. The recloser 10 can include a mounting bracket 16 for mounting the housing 12 to a utility pole or other structure.

A battery 18 can be used, for example, as a power source for the electronic control assembly in order to close the vacuum interrupter contacts, such as when initially installing the recloser 10 and after lock-out due to a permanent fault. The battery 18 can be used for other purposes as well, such as powering peripheral devices coupled to the recloser or providing power to external indicators, such as external visual indicators. The battery 18 is received within the housing 12 and removably secured thereto. Additional components and operation of the recloser 10 as understood by one of ordinary skill in the art are further described in U.S. Pat. No. 6,794,596, which is hereby incorporated by reference in its entirety.

Figure 2:
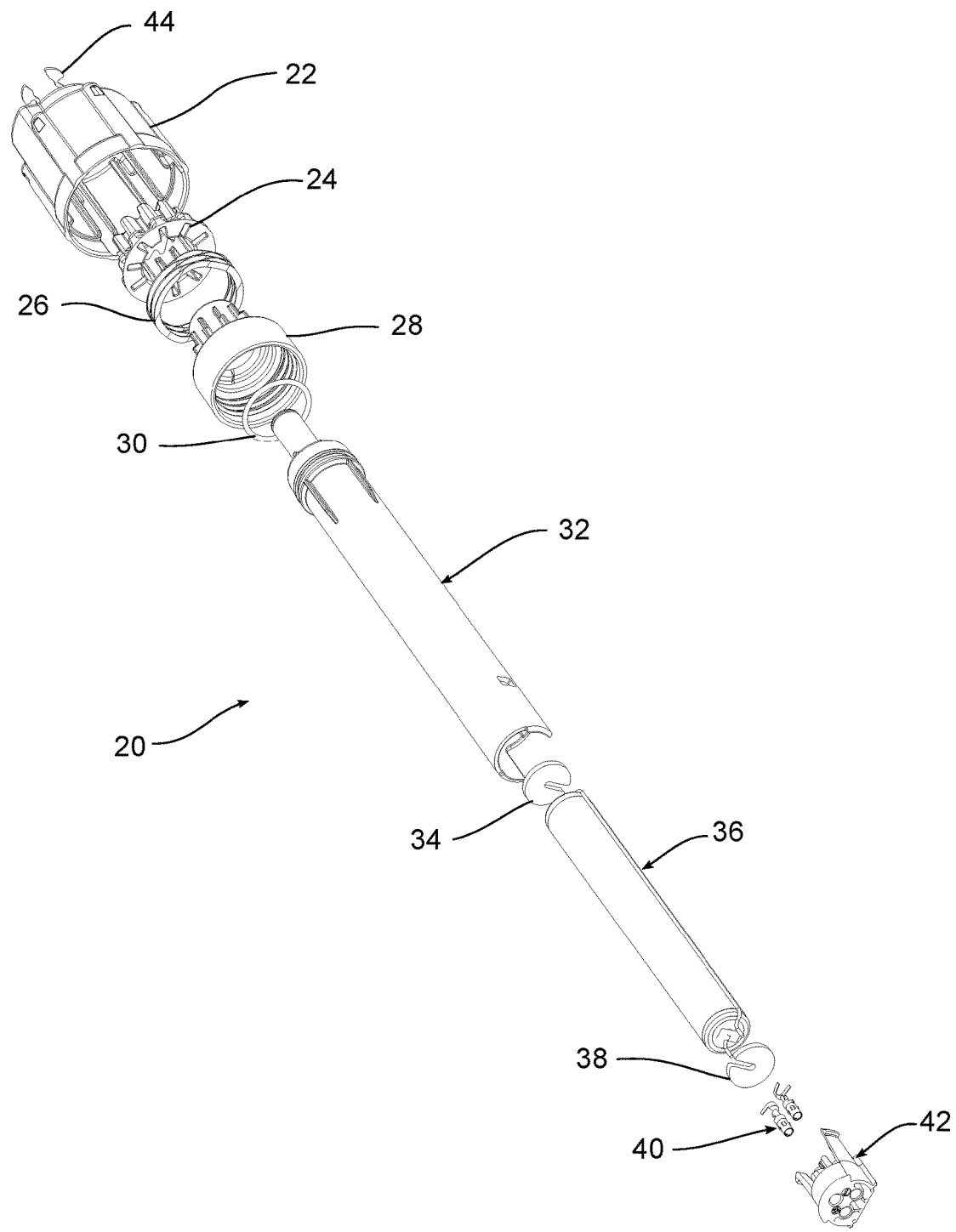
FIG. 2 is an exploded view of an exemplary battery assembly for use with a recloser.
Figure 3:
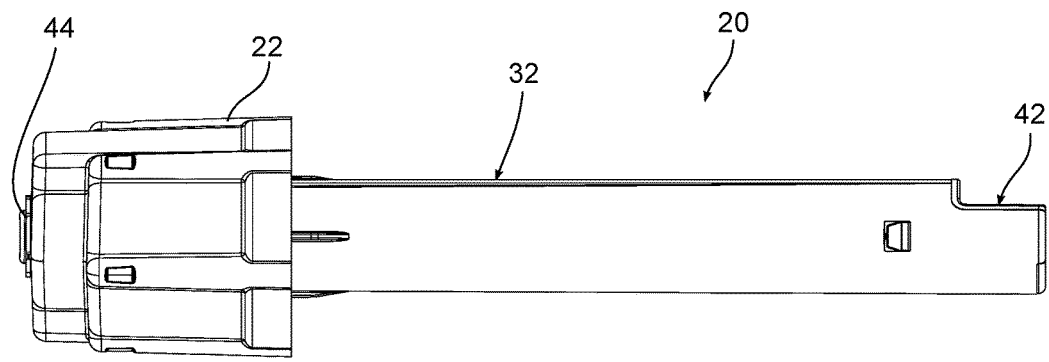
FIG. 3 is a side view of the assembled battery assembly.
Figure 4:
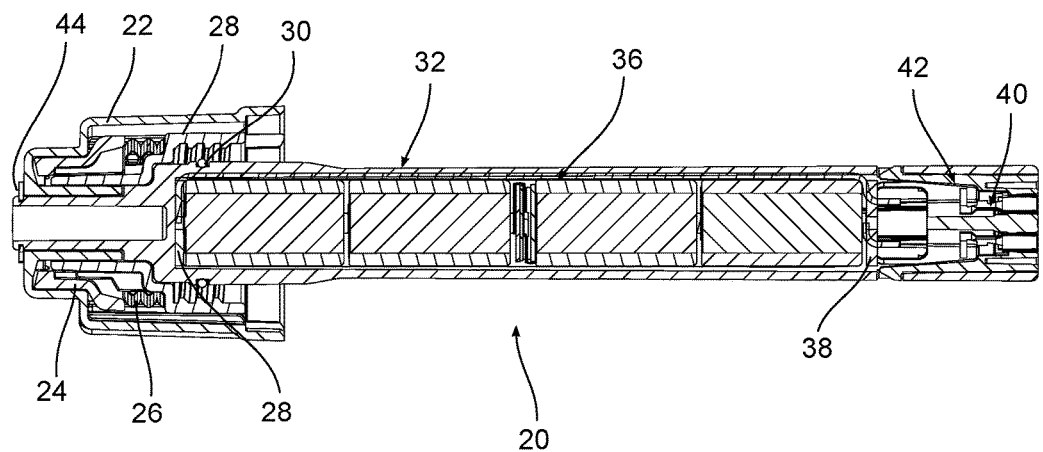
FIG. 4 is a side, sectional view of the battery assembly rotated 90 degrees from FIG. 3.

FIGS. 2-4 shows show an exemplary embodiment of a battery assembly 20 that includes a cap 22, a ratchet member 24, a biasing member 26, a first connector 28, a seal (e.g. O-ring) 30, an assembly body 32, a first battery pad 34, a battery 36, a second battery pad 38, a set of contacts 40, and a contact casing 42. When assembled, a portion of the assembly body 32 extends through the first connector 28, the biasing member 26, ratchet member 24, and the cap 22 and is held in place by a retainer 44, for example an E-clip. The battery 36 and battery pads 34, 38 are retained in the assembly body 32 and the contact casing 42 includes a detent, such as one allowing for a snap-fit connection to the assembly body 32.

Figure 5:
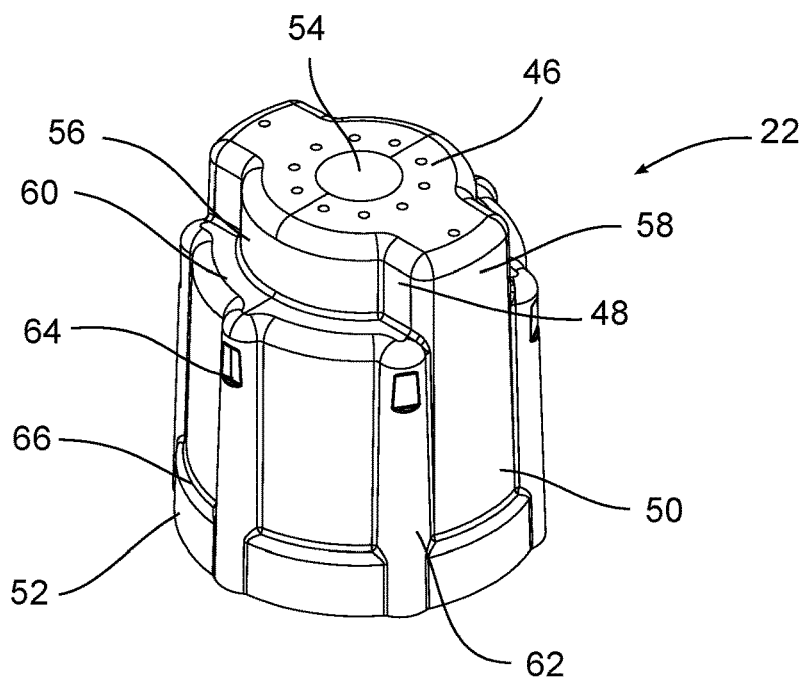
FIG. 5 is a perspective view of an exemplary cap.
Figure 6:
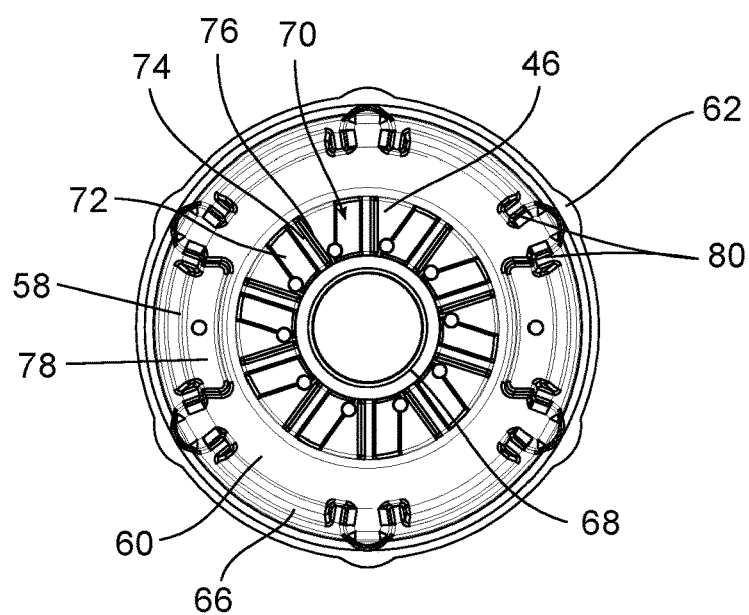
FIG. 6 is a rear view of FIG. 5.
Figure 7:
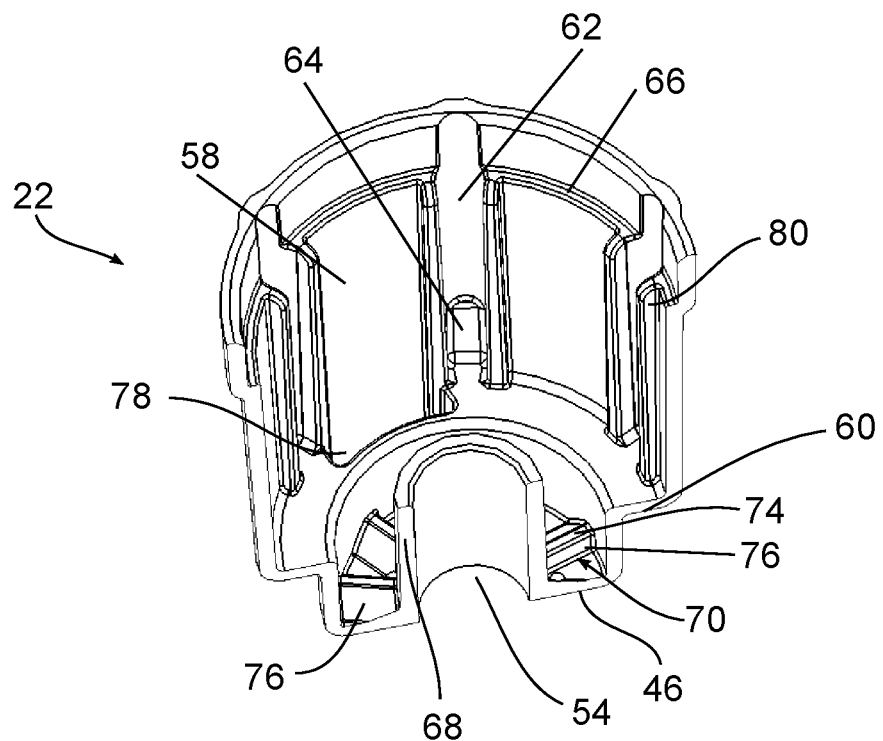
FIG. 7 is a rear, sectional view of FIG. 5.

FIGS. 5-7 show an exemplary embodiment of the cap 22. As shown in FIG. 5, the cap 22 includes a front wall 46 a first section 48 extending from the front wall 46, a second section 50 extending from the first section 48, and a third section 52 extending from the second section 50. A central opening 54 extends through the cap for receiving at least a portion of the assembly body 32. In an exemplary embodiment, the assembly body is rotatably connected to the cap by the first connector 28 and secured by the retainer 44.

The first section 48 of the cap 22 includes a substantially cylindrical portion 56 and a pair of shoulders 58 extending from the cylindrical portion 56. The first and second shoulders 58 have a substantially rectangular configuration, although other configurations such as differently shaped extruded portions or indentations such as channels may be utilized. In an exemplary embodiment, the first and second shoulders 58 extend the height of the cap 22 from the first section 48 to the third section 52. A first ledge 60 is formed between the first section 48 and the second section 50. The second section 50 further includes one or more protrusions 62, each protrusion having a notch 64. The protrusions 62 can extend to the bottom of the cap and at least partially define an arcuate recessed portion. A second ledge 66 is formed between the second section 50 and the third section 52. The third section 52 is wider than the second section 50.

FIGS. 6 and 7 show the interior of the cap 22. A boss 68 extends from the front wall 46 into the interior of the cap 22 around the central opening 54. The rear portion of the front wall 46 includes a plurality of first teeth 70. The teeth 70 have a substantially right-trapezoidal configuration with an angled side 72, a substantially planar top 74, and a vertical side 76. As illustrated in FIG. 7, a depression 78 is provided adjacent each of the first and second shoulders 58 and a pair of tabs 80 bound the interior of each protrusion 62. The depression 78 and tabs 80 ensure proper placement, a secure fit and robust grip for a utility tool, e.g., a hotstick, during ground installation of the battery.

Figure 8:
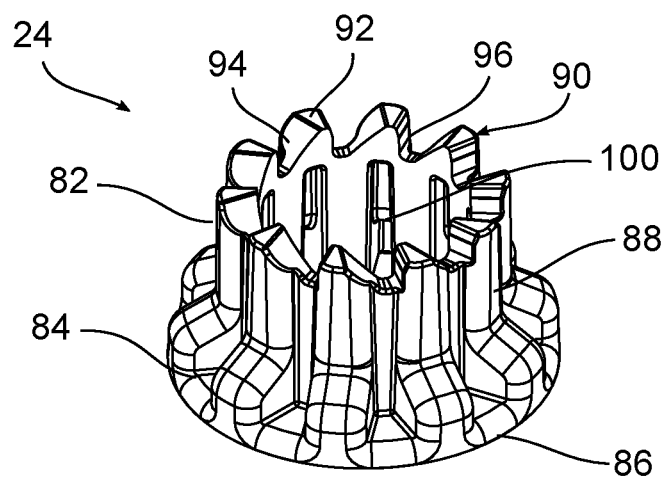
FIG. 8 is a perspective view of an exemplary ratchet member.
Figure 9:
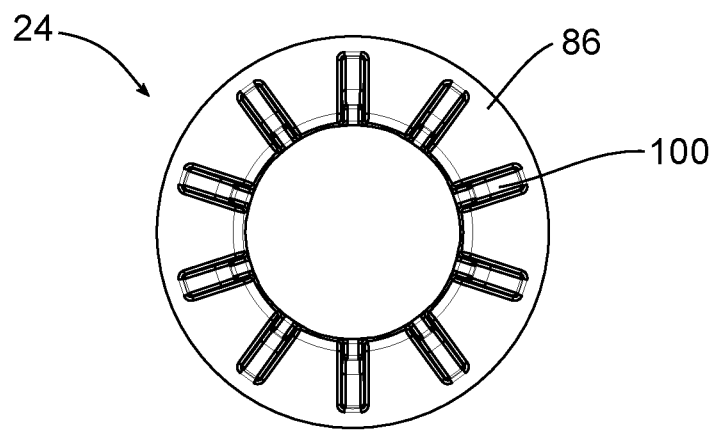
FIG. 9 is a rear view of FIG. 8.

FIGS. 8 and 9 show an exemplary embodiment of the ratchet member 24. The ratchet member 24 includes a first section 82 having a first width and a second section 84 having a second width larger than the first width in one embodiment. In this embodiment, the components are substantially cylindrical and the first and second widths are a given diameter relative to the size of the component, for example a normalized outer diameter. As best shown in FIG. 9, a flange 86 is included along bottom of the second section 84.

On the exterior of the ratchet 24, the first section 82 includes a set of projections 88 that terminate as a plurality of second teeth 90. The second teeth 90 include a top portion 92, an angled side 94, and a substantially vertical side 96. The projections 88 include hip portions that increase in width toward the flange 86. In some embodiments, a plurality of slots 100 is positioned along the interior wall of the ratchet member 24. The slots 100 have a first portion with a first slot width in the flange 86 and the hip portion and a second portion having a second slot width that is less than the first slot width in the first section 82.

Figure 10:
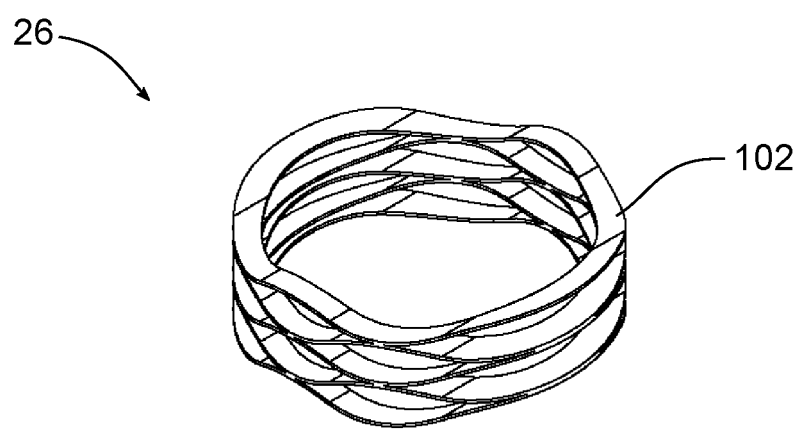
FIG. 10 is a perspective view of an exemplary biasing member.

FIG. 10 shows an exemplary embodiment of the biasing member 26 in the form of a set of wave springs 102. The wave springs 102 are stacked and may be connected or formed as a single component in some embodiments.

Figure 11:
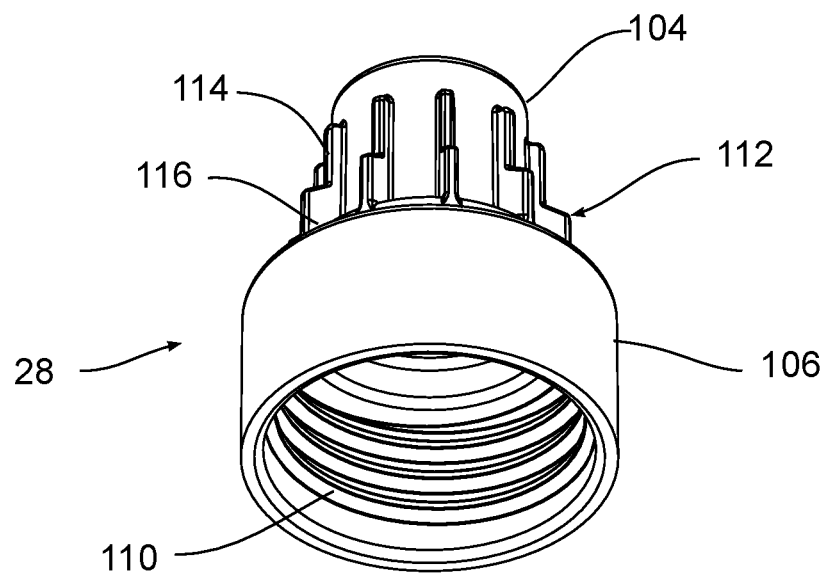
FIG. 11 is a perspective view of an exemplary threaded member.
Figure 12:
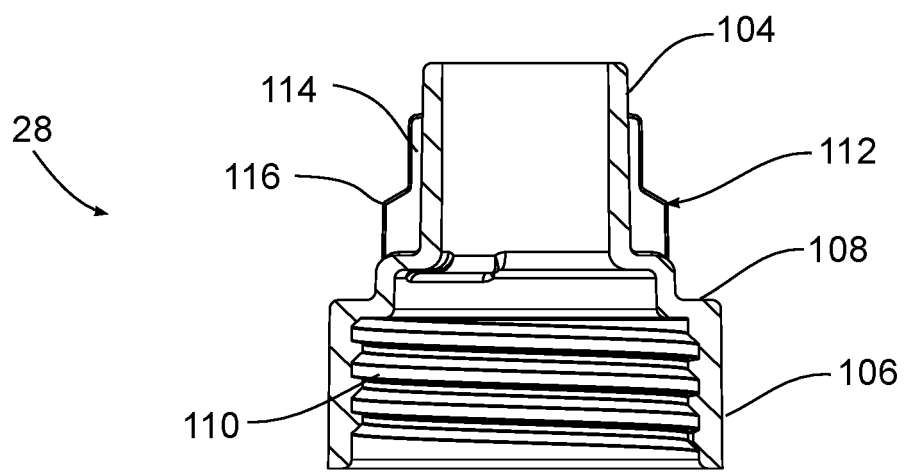
FIG. 12 is a side, sectional view of FIG. 11.

FIGS. 11 and 12 show an exemplary embodiment of the first connector 28. In one embodiment, the first connector 28 may include a threaded component having a front section 104 and a rear section 106. The rear section 106 has a width greater than the front section 104 and a circular shoulder, or ledge 108 is formed between the front section 104 and the rear section 106. Additionally, the interior of the rear section 106 includes an internal threaded wall 110. The exterior of the front section 104 includes one or more tines 112 extending from a cylindrical surface and above the circular shoulder 108. The tines 112 include a first upper portion 114 and a second base portion 116 that is wider than the first upper portion 114.

Figure 13:
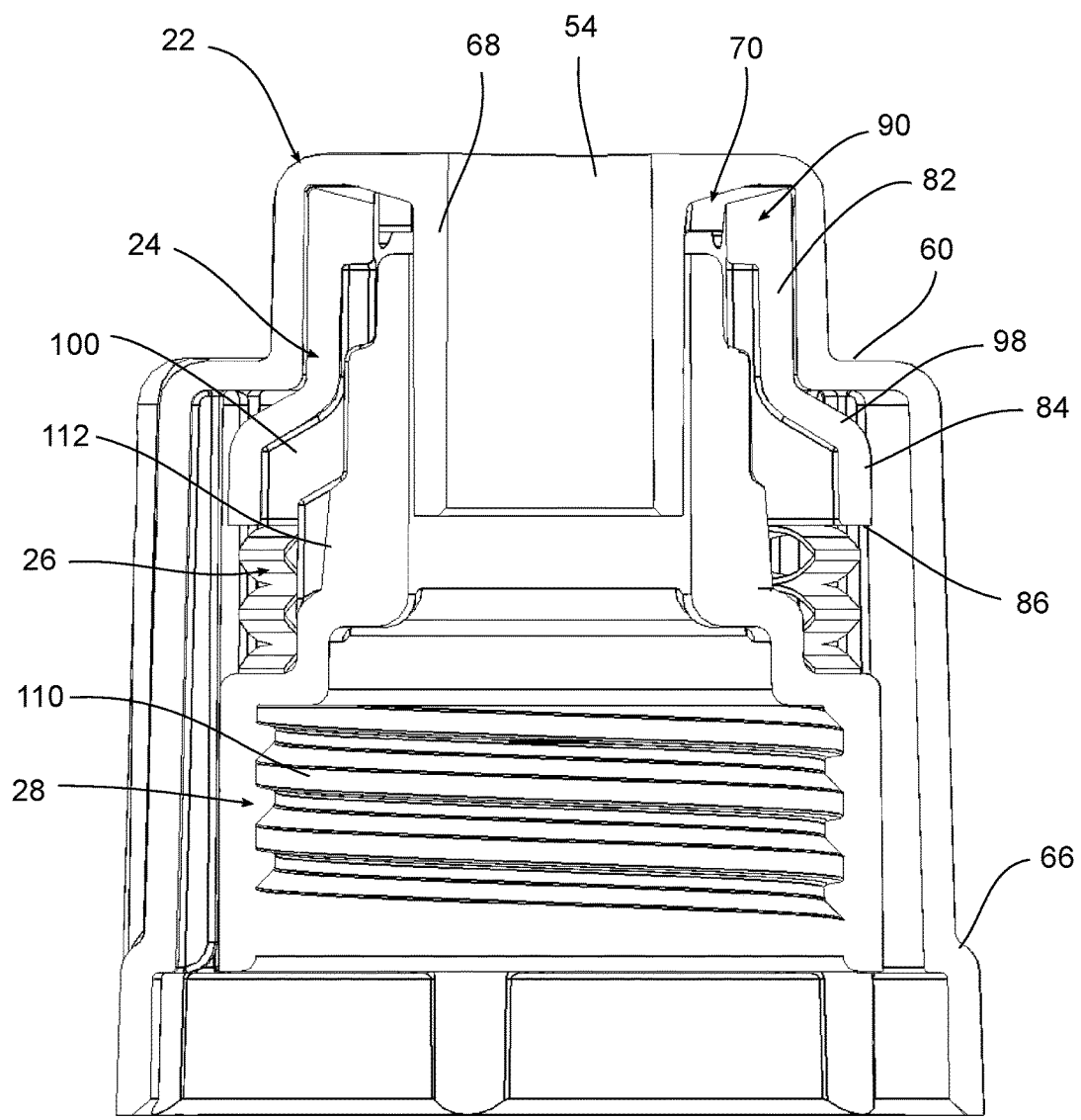
FIG. 13 is a side, sectional view of the assembled cap, ratchet member, biasing member, and threaded member.

As shown in FIG. 13, when assembled, the biasing member 26 is positioned over the first connector 28 resting on the circular shoulder 108. The ratchet member 24 is then positioned over the biasing member 26 and the first connector 28, with the tines 112 extending into the slots 100 of the ratchet member 24 and the biasing member 26 engaging the flange 86. The ratchet member 24, biasing member 26, and first connector 28 are inserted into the cap 22, with the boss 68 extending into the front section 104 of the first connector 28 and the first teeth 70 of the cap 22 engaging the second teeth 90 of the ratchet member 24. The cap 22, ratchet member 24, biasing member 26, and first connector 28 combine to form a torque limiter that prevents the first connector 28 from being over tightened.

Figure 14:
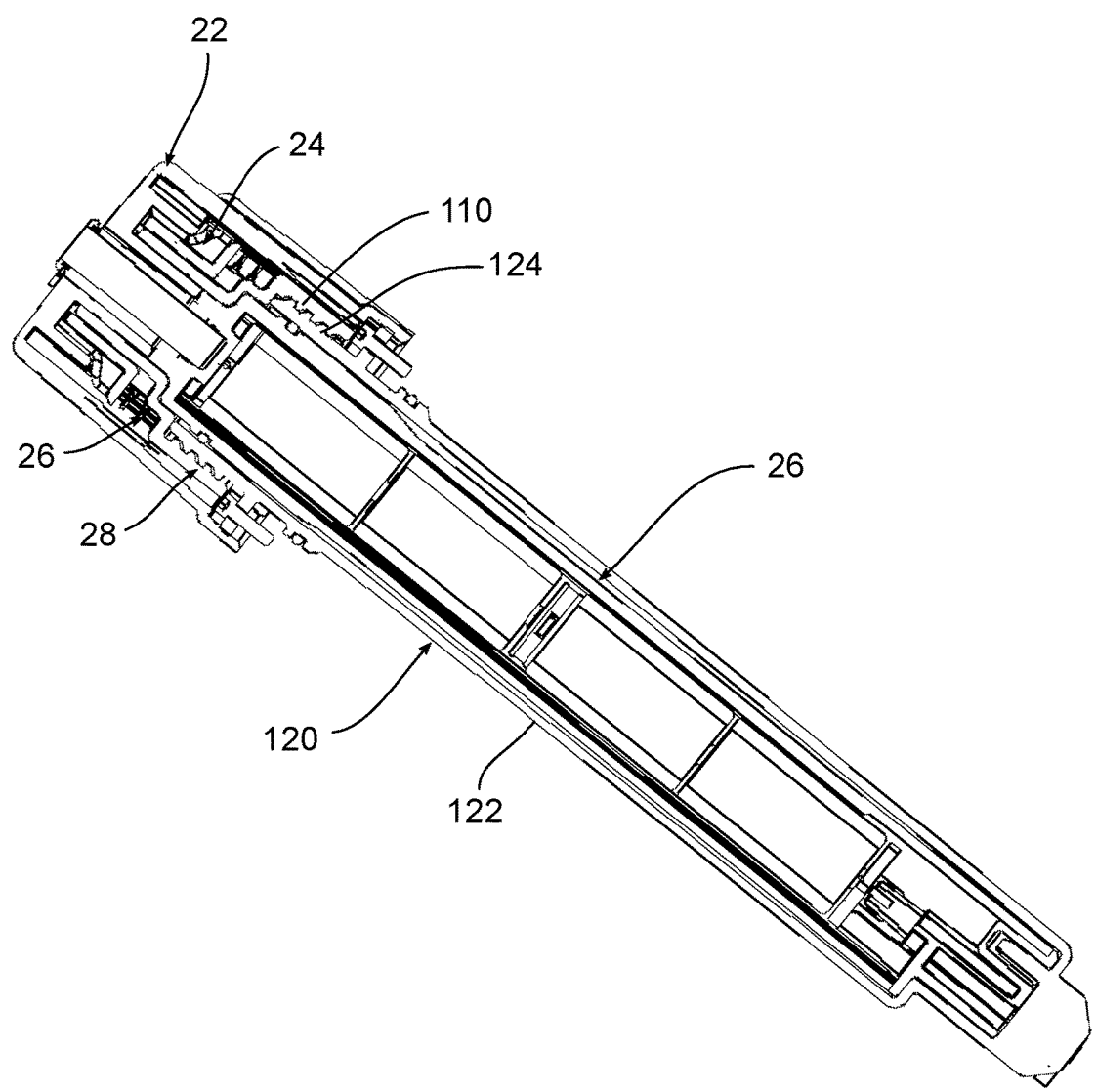
FIG. 14 is aside, sectional view of the battery assembly connected to an exemplary battery tube.

According to an exemplary embodiment, the battery assembly 20 is inserted into a battery tube 120 coupled to the recloser 10. FIG. 14 shows an exemplary battery tube 120 that includes a substantially cylindrical body 122 for receiving the assembly body 26 and an external connector 124 that mates with the first connector 28 of the battery assembly 20. The battery tube 120 is shown as separated from a recloser 10 housing 12 for clarity. In some embodiments, the battery tube 120 is separable from the housing 12. In other embodiments, the battery tube 120 is formed integrally with the recloser housing 12. Additionally, it should be understood that although a cylindrical tube is illustrated, the battery tube 120 may be any type of receptacle capable of receiving the battery assembly 20 and allowing power to be supplied from the battery to the circuit interrupting device.

During installation, the cap 20 can be rotated to connect, e.g., via threading, the first connector 28 with the external connector 124 of the battery tube 120. The teeth 90 of the ratchet member 24 are normally biased into engagement with the teeth 70 of the cap 22, rotatably fixing the cap 22, ratchet member 24, and the first connector 28 together. As the first connector 28 is rotated, the amount of torque increases which in turn increases the axial force exerted on the ratchet member 24 through engagement of the first and second sets of teeth 70, 90. When a torque limit is reached, the biasing member 26 is compressed and the ratchet member 24 at least partially disengages from the cap 22. This disengagement causes the cap 22 to rotate relative to the ratchet 24. As the teeth 70, 90 are misaligned and slide relative to one another, an audible sound is produced to alert the user that the torque limit has been reached. In some embodiments, the torque limit is adjustable by through modification of the spring force in the biasing member 26. In an exemplary embodiment, the assembly body 26 maintains a substantially consistent orientation throughout the connection process.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A circuit interrupting device for use with an electrical power distribution system, comprising:
   a housing containing a circuit interrupting device;
   a battery tube positioned in the housing; and
   a battery assembly configured to be inserted into the battery tube, the battery assembly comprising,
      a assembly body having a first end and a second end,
      a battery positioned in the assembly body,
      a cap assembly connected to the assembly body and configured to connect the battery assembly to the battery tube,
      wherein the cap assembly includes a torque-limiting device that prevents overtightening of the cap to the battery tube.

2. The circuit interrupting device of claim 1, wherein the cap assembly includes a cap having a first set of teeth and a ratchet member having a second set of teeth configured to mate with the first set of teeth.

3. The circuit interrupting device of claim 2, wherein the cap assembly includes a biasing member that biases the ratchet member toward the cap.

4. The circuit interrupting device of claim 2, wherein the cap assembly includes a threaded member connected to the ratchet member.

5. The circuit interrupting device of claim 1, wherein the cap assembly includes an internal thread and the assembly body includes an external thread.

6. The circuit interrupting device of claim 1, wherein a portion of the assembly body extends through the cap assembly.

7. The circuit interrupting device of claim 1, wherein the assembly body is rotatable with respect to the cap assembly.

8. A circuit interrupting device for use with an electrical power distribution system, comprising:
   a housing containing a circuit interrupting device;
   a battery tube positioned in the housing, the battery tube having a first thread; and
   a battery assembly configured to be inserted into the battery tube, the battery assembly including a second thread configured to mate with the first thread to form a threaded connection
   wherein the battery assembly includes a torque limiting device that is configured to prevent overtightening of the threaded connection.

9. The circuit interrupting device of claim 8, wherein the battery assembly includes a first set of teeth and a second set of teeth, the first set of teeth are configured to mate with the second set of teeth until a torque limit is reached, and the first set of teeth are configured to disengage from the second set of teeth after the torque limit is reached.

10. The circuit interrupting device of claim 9, wherein the first set of teeth have a right-trapezoidal configuration.

11. The circuit interrupting device of claim 9, wherein the second set of teeth are biased toward the first set of teeth by a biasing member.

12. The circuit interrupting device of claim 11, wherein the biasing member includes a wave spring.

13. A circuit interrupting device for use with an electrical power distribution system, comprising:
   a housing containing a circuit interrupting device;
   a battery tube positioned in the housing; and
   a battery assembly configured to be inserted into the battery tube, the battery assembly comprising,
      a assembly body having a first end and a second end,
      a battery positioned in the assembly body,
      a cap connected to the first end of the assembly body,
      a ratchet member releasably connected to the cap,
      a threaded member connected to the ratchet member, and
      a biasing member positioned between the threaded member and the ratchet member.

14. The circuit interrupting device of claim 13, wherein the assembly body includes a shaft that extends through the cap and a retainer is connected to shaft externally of the cap to connect the cap to the assembly body.

15. The circuit interrupting device of claim 13, wherein the cap is rotatably fixed to the ratchet mechanism and the threaded member until a torque limit is reach and the cap rotates with respect to the ratchet mechanism after the torque limit is reached.

16. The circuit interrupting device of claim 15, wherein the cap includes a first set of teeth and the ratchet member includes a second set of teeth biased into engagement with the first set of teeth by the biasing member, and wherein the second set of teeth is disengage from the first set of teeth after the first torque limit has been reached.

17. The circuit interrupting device of claim 13, wherein the threaded member includes a set of tines and the ratchet member includes a set of slots configured to receive the tines.

18. The circuit interrupting device of claim 17, wherein the tines include a first portion having a first width and a second portion having a second width greater than the first width.

19. The circuit interrupting device of claim 13, wherein the cap includes a front wall and a boss extending from the front wall into the cap, and wherein the boss is received in a portion of the threaded member.

20. The circuit interrupting device of claim 13, wherein the ratchet member, biasing member, and the threaded member are positioned in an interior of the cap.

\* \* \* \* \*